United States Patent Office 3,560,492
Patented Feb. 2, 1971

3,560,492
ETHYLENICALLY-UNSATURATED CYCLIC
NITRILE ADDUCT COMPOUNDS
Emmett H. Burk, Jr., Glenwood, Ill., and Donald D.
Carlos, Crown Point, Ind., assignors to Sinclair Research, Inc., New York, N.Y.
No Drawing. Application Nov. 9, 1967, Ser. No. 681,925,
now Patent No. 3,480,595, dated Nov. 25, 1969, which
is a continuation-in-part of application Ser. No.
592,285, Nov. 7, 1966. Divided and this application
Dec. 6, 1968, Ser. No. 804,030
Int. Cl. C07d 85/52, 87/02, 91/04
U.S. Cl. 260—240                             17 Claims

ABSTRACT OF THE DISCLOSURE

The disclosure is of ethylenically-unsaturated cyclic nitrile compounds of the formula

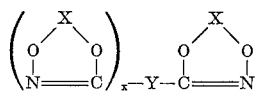

wherein X is a thionyl, carbonyl or oxalyl group, Y is an addition-polymerizable, ethylenically-unsaturated group (e.g., vinyl), and $x$ is 0 or 1. The compounds may be polymerized to form homopolymers or addition polymers with ethylenically-unsaturated polymerizable monomers (e.g. styrene).

---

This application is a division of application Ser. No. 681,925, filed Nov. 9, 1967, now U.S. Pat. 3,480,595 granted Nov. 25, 1969, which latter application is a continuation-in-part of application Ser. No. 592,285, filed Nov. 7, 1966.

The present invention relates to a new class of compounds. More particularly, the invention concerns certain novel, ethylenically-unsaturated cyclic nitrile adducts and addition polymers thereof. The polymers can be homopolymers or polymers of the addition-polymerizable cyclic nitrile adducts with dissimilar, ethylenically-unsaturated monomers.

The cyclic nitrile adducts of the invention can be represented by the following structure:

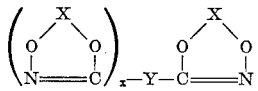

whererin X is a thionyl,

carbonyl,

or oxalyl,

group, $x$ is 0 or 1, and Y is an ethylenically-unsaturated hydrocarbon group, usually of 2 to about 20, or 2 to about 12, carbon atoms. The Y group is essentially hydrocarbonaceous, this term being intended to include hydrocarbons which are substituted with non-deleterious substituents, for example, chlorine or bromine. When free of aromatic substituents, Y preferably has 2 to about 6 carbon atoms; when containing aromatic substituents, Y preferably has 8 to about 12 carbon atoms. The Y group may be poly-, for example, di-, as well as mono-, ethylenically-unsaturated. When $x$ is 0, it is often preferred that the ethylenic group, $>C=C<$, be a terminal ethylenic group, i.e., $CH_2=C<$.

As specific examples of suitable Y groups for the adducts of the present invention may be mentioned vinyl, vinylidene or vinylene hydrocarbon groups, preferably of 2 to 20 carbon atoms, such as for instance, mono- and di-alphaolefinic groups such as vinyl, 1-pentenyl, 1-octenyl, 1,4-butadienyl and isoprenyl groups and vinyl, vinylidene or vinylene aromatic groups such as, for instance, styrenyl, alpha-, ortho-, meta- and para-methylstyrenyl groups, divinylbenzenyl groups, etc. Thus, illustrative of the cyclic compounds of the invention when named as nitrile derivatives are, for example, acryonitrile oxalate, acrylonitrile carbonate, p-vinyl benzonitrile carbonate, fumaronitrile dicarbonate, methacrylonitrile oxalate, fumaronitrile disulfite, crotononitrile carbonate, mesacononitrile dicarbonate, etc.

Ethylenically-unsaturated cyclic nitrile adducts of the present invention are useful, for instance, as precursors for preparing the corresponding ethylenically-unsaturated isocyanates and as addition-polymerizable monomers for the preparation of cyclic nitrile-containing polymers, which polymers are, in turn, useful as precursors for the corresponding isocyanate-containing polymers. In general, the cyclic nitrile sulfite ring is less stable than the nitrile oxalate group, the latter being less stable than the nitrile carbonate group. As a result the nitrile sulfite adducts are usually less suitable for making polymers, especially if it is desired to keep the cyclic nitrile sulfite ring intact during polymerization, but these nitrile sulfites are readily decomposed by heat to the corresponding unsaturated isocyanates. On the other hand the nitrile carbonates can be difficult to thermally decompose to isocyanates.

Thus, for example, the cyclic nitrile sulfite adducts of the invention can, by the application of heat, be converted to the corresponding, ethylenically-unsaturated isocyanates with $SO_2$ being evolved in the reaction. Paravinyl benzonitrile sulfite, for instance, when heated to about 85° C. is converted to p-vinylphenylisocyanate. Similarly, the cyclic nitrile oxalate adducts, when heated, generate the corresponding, unsaturated isocyanates with $CO_2$ and CO being evolved, or these oxalate adducts may first be addition polymerized to form polymeric precursors of polymeric isocyanates. Finally, the cyclic nitrile carbonate adducts of the invention may likewise be addition polymerized to yield cyclic nitrile carbonate-containing polymers.

The molecular weight of the cyclic nitrile adduct-derived addition type polymers of the present invention may vary widely as, for instance, from about 250 or 750 to about 20,000 or 500,000 or more, often about 750 to 20,000. As aforementioned, the polymers may be homopolymers, in which case the cylic nitrile adduct-derived groups repeat in a regular fashion, or polymers of the cyclic nitrile adduct and at least one dissimilar ethylenically-unsaturated monomer. In the latter case, the polymers may be regular, random, block or graft, at least 1 to 99% by weight of which being composed of the cyclic nitrile adduct-derived monomer with the balance 99 to 1% being composed of one or more dissimilar ethylenically-unsaturated monomers. Often preferred polymers are those wherein about 5 to 25 weight percent of the monomers is composed of the cyclic nitrile adduct.

By dissimilar, ethylenically-unsaturated monomers is meant monomers which are different from the cyclic nitrile adduct monomers of the invention, that is, which fall outside the definition of the class of cyclic nitrile adducts described herein. Suitable such dissimilar monomers which may be reacted with the polymerizable cyclic nitrile adducts to form polymers of the present invention are chemically stable under the conditions employed for addition polymerization and have no groups which react with the cylic nitrile groups of the adducts under such conditions. These dissimilar monomers are addition-polymerizable due to their being at least mono-ethylenically-unsaturated. The dissimilar monomer usually contains 2 to about 20 carbon atoms, and often preferred are those monomers having a terminal ethylenic group, i.e.,

Suitable dissimilar monomers include vinyl hydrocarbons such as, for instance, mono- and di-alpha olefins such as ethylene, 1-octene, butadiene and isoprene; styrene, alpha-, ortho-, meta- and para-methyl-styrenes, the divinylbenzenes, etc.; the acrylic type acids, nitriles, amides and esters; the allylic-type carboxylic esters and alcohols; the monovinyl-pyridines; n-vinyl pyrrolidone, vinylidene monomers; vinyl esters of carboxylic acids; vinyl halides; the alkyl vinyl ethers; the alkyl vinyl ketones; alkylene dicarboxylic acids and anhydrides, etc.

Some acrylic type compounds may have the structure:

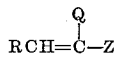

wherein Q is hydrogen, halogen or a hydrocarbon radical, say of 1 to 12 carbon atoms, as, for instance, alkyl, alkenyl, cycloalkyl, aryl and aralkyl and Z is selected from —CN, —COOR and

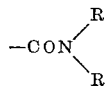

wherein R is hydrogen or a hydrocarbon radical as defined in Q above. Important monomers of this type include acrylonitrile and the ethylacrylates, including the lower alkylmethacrylates.

Allylic-type esters and acids include those having the structure:

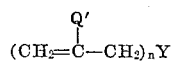

wherein Q' is hydrogen, halogen,

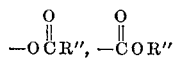

or a hydrocarbon radical of 1 to 12 carbon atoms, preferably alkyl or aryl; $n$ is 1 to 2; Y is

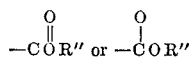

when $n$ is 1, and a diacyloxy radical of a carboxylic acid when $n$ is 2. R'' in the radicals

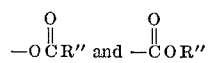

may be hydrogen or a hydrocarbon radical such as an alkyl, alkenyl, cycloalkyl, aryl or aralkyl, usually of 2 to 12 carbon atoms. Representative monomers of this type are di(methallyl) succinate, allyl acetate, diallyl phthalate and dimethyl itaconate.

Monovinylpyridines include vinylpyridines, viz., the 2-vinyl, 3-vinyl- and 4-vinylpyridines, and the alkyl-substituted vinylpyridines, e.g., 2-methyl-5-vinylpyridine, and the like. N-vinyl monomers include N-vinylpyrrole, N-vinyl carbazole, N-vinylindole, N-vinylsuccinimide and the like.

Vinyl compounds include those having the structure $CH_2$—CH—A where A is halogen or an acyloxy radical as for instance vinyl chloride and vinyl acetate. Vinylidine monomers include, for example, vinylidine dichloride, diacetate, dinitrile and the like. Illustrative of suitable alkylene dicarboxylic acids and anhydrides are maleic, gluconic and allylmalonic acids and anhydrides.

The novel polymers of the invention may be solid or liquid and can be prepared by known polymerization processes such as solution, bulk and emulsion processes.

Solution polymerization in a suitable solvent, employing as a polymerization catalyst a free-radical initiator, such as a peroxide or an azo-type catalyst, is preferred. Suitable solvents for solution polymerization include aromatic hydrocarbon solvents such as benzene, cumene, xylene, toluene, etc. Some examples of free-radical polymerization catalysts are benzoyl peroxide, dicumyl peroxide, azoisobutyronitrile, alpha,alpha' - azodiisobutyronitrile, etc.

The polymerization is often carried out at a temperature below the decomposition temperature of the ring of the cyclic nitrile adduct compound employed but such decomposition may be effected during polymerization if desired or if not deleterious. In general, the polymerization can be performed at temperatures of about 50 to 125° C., and advantageously the temperatures can be about 70 to 90° C.

The polymers of the present invention are valuable intermediates or precursors for the preparation of organic foams, elastomers, drying oils, etc. As mentioned earlier, for example, the polymers can be thermally decomposed to polyisocyanates which may be reacted or crosslinked, for instance, with diamines or diols, to give thermosetting materials. These polyisocyanates may also be used as plasticizers or in the preparation of urethane coatings, adhesives, sealants, etc. The new polymers of the present invention can also be hydrolyzed to hydroxamic acids.

An additional feature of the polymers of the invention is that they may be reacted with polyamines or polyols to provide polyhydroxamates which are the subject of copending appliaction Ser. No. 592,288 filed Nov. 7, 1966. Reaction of the cyclic nitrile adduct group-containing polymers of the invention with polyols produces thermoplastic materials containing a certain hydroxamate as crosslinks, described in the above copending application Ser. No. 592,288 between polymer chains which crosslinks are thermally unstable and break down with mild heating to isocyanate groups and the corresponding polyol. The resulting polymeric material is then easily molded, after which crosslinks again reform by reaction of the isocyanate and polyol to give a thermoset material. Thus, the novel hydroxamates provide a method of making molded objects from thermoset materials such as crosslinked polyurethanes without resorting to the relatively high temperatures ordinarily required to render crosslinked polyurethanes moldable and, therefore, without the product degradation that often accompanies the use of such high temperatures.

Another advantage of the polymers of the invention resides in the fact that they contain an internal or "built in" blowing agent in their structure, that is, the carbon dioxide and carbon monoxide they evolve upon decomposition. This feature can be utilized in the preparation of organic foams such as polyurethane foams. The ability of the polymers of the invention to generate polyisocyanates upon heating provides an additional advantage in that the polymers of the invention, in contrast to isocyanates, are stable in the absence of water and therefore can be handled and stored.

Decomposition of certain of the polymers to the corresponding polyisocyanates can be effected by heating the polymers to a temperature below the degradation point of the desired polyisocyanate product. The heating temperature employed will vary, of course, depending upon the decomposition temperature of the feed and degradation temperature of the particular polyisocyanate being prepared. In most cases, however, temperatures will usually fall in the range of about 50 to 200° C., preferably about 75 to 150° C. Advantageously, the decomposition is conducted in the presence of an inert solvent such as benzene, xylene, toluene, chlorobenzene and the like.

The cyclic nitrile adduct monomers of the invention can be prepared by reacting the appropriate hydroxamic acid and acid chloride. For example, vinyl benzonitrile sulfite can be prepared by reacting vinyl benzohydroxamic acid with thionyl chloride. Hydroxamic acids which react with thionyl chloride, oxalyl chloride and phosgene to produce the nitrile monomers can be represented by the structure:

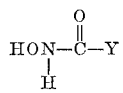

wherein Y is as defined above in the structure of the nitrile monomers.

The temperature for effecting the reacting of the hydroxamic acid and acid chloride may vary depending upon the particular hydroxamic acid selected but in all cases should be conducted below the decomposition temperature of the desired nitrile monomer. Reflux temperatures can also be used as long as the reflux temperature of the particular mixture is below the decomposition temperature of the corresponding nitrile monomer produced. The reaction temperature will often fall in the range of up to about 90° C., preferably up to about 50° C., when preparing aromatic nitrile monomers and often up to about 40° C. or 70° C., preferably up to about 30° C., when preparing aliphatic nitrile monomers. The reaction can be successfully run at temperatures as low as about −30° C. Ordinarily the reaction will proceed readily at atmospheric pressure but sub- and superatmospheric pressure can be employed if desired. The acid chloride reactant can be in excess and a large excess of acid chloride is particularly preferred. The reaction can be conducted in the liquid phase and in many cases the hydroxamic acid will react from the solid state. Advantageously, the hydroxamic acid is first dissolved or slurried in aromatic hydrocarbons, halogenated aliphatic hydrocarbons or an oxygen-containing organic solvent. Illustrative of suitable solvents are the acid chloride reactant itself and normally liquid organic materials such as chloroform, benzene, toluene, ethers, esters, furans, dioxanes, and the like. A preferred solvent is the acid chloride reactant, an excess of which will partially dissolve the hydroxamic acid.

The reaction is often over in less than about 0.5 hour, for example, within 15 minutes, or in about 5 to 20 hours, depending upon the reaction temperature employed, and is marked by a cessation in hydrogen chloride gas evolution. Normally at least about 0.5 hour is required for the reaction to go to completion at temperatures which minimize side reactions. The reaction is usually quite rapid as the hydroxamic acid is dissolved. At the lower reaction temperatures the hydroxamic acid is generally slow to dissolve and may even come out of solution, go back into solution, etc., during the reaction.

The nitrile monomer can be recovered from the resulting solution by any desirable means, for instance, by first filtering the resulting solution to remove any unreacted starting materials and subjecting the filtrate to reduced pressure to remove unreacted acid chloride and inert solvent, if employed, and provide the nitrile monomer as a crude product. Alternately, prior to the filtering step, the solution can be cooled to crystallize out the product and the product then recovered as described. The crude product, which can be either crystalline or liquid, depending on the particular nitrile monomer prepared, contains small amounts of impurities high in chlorine content. A purer product, essentially chlorine-free, can be obtained by recrystallization techniques, as, for instance, from a suitable solvent such as ether, pentane, dichloromethane, carbon disulfide, ethyl acetate, acid chloride and the like, and mixtures thereof.

A convenient method for obtaining an essentially chlorine-free nitrile monomer is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular nitrile monomer feed selected. If desired, a combination of both the recrystallization and extraction methods can be used to obtain essentially chlorine-free monomer.

An alternative method of preparing cyclic nitrile carbonate adducts, represented by the structure given above, wherein —X— is

is by initially reacting hydroxylamine and an aliphatic lactone to form an aliphatic hydroxamic acid having a hydroxyl substituent on the aliphatic chain. The hydroxamic acid is then reacted with an excess of phosgene to convert the alcohol portion to a chloroformate and the hydroxamic acid portion to the cyclic nitrile carbonate. Reaction of the cyclic nitrile chloroformate and a strong base, for example, a strong tertiary amine, gives a nitrile adduct monomer having the desired polymerizable, ethylenically-unsaturated Y substituent.

The above reactions may be represented by the following general equations, wherein R is alkylene of 1 to 3 carbon atoms, R' is hydrogen or hydrocarbyl, e.g., lower alkyl, and $n$ is 0 or 1:

(1)
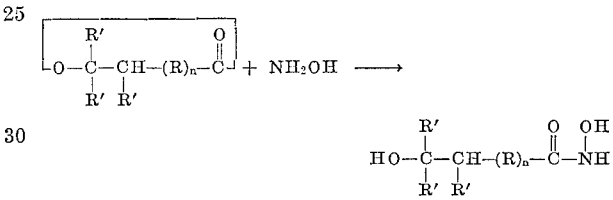

(2)
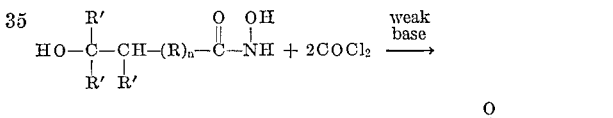

(3)
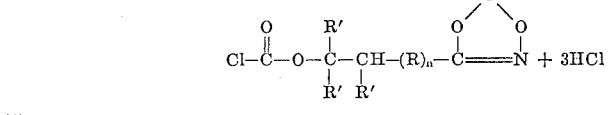

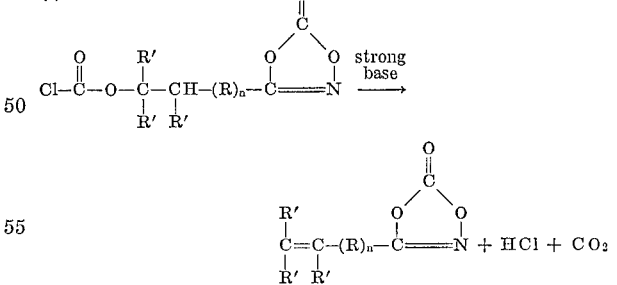

The aliphatic lactone reacted with hydroxylamine can have 4 to 7 members in the ring and may be substituted with, for example, lower alkyl groups, provided that the lacetone contains at least one hydrogen atom attached to a carbon atom (whether pendant or in the ring) which is adjacent to the carbon atom which forms an ester linkage with the ring oxygen. By way of explanation, in the formula:

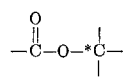

that carbon which is indicated by the asterisk (*) is considered the carbon atom which forms an ester linkage with the oxygen. Adjacent thereto must be another carbon atom (not shown) having at least one hydrogen atom attached to it. As examples of suitable aliphatic lactones there may be mentioned, then β-propriolactone, β-isobutyrolactone, β-isovalerolactone, α-isocrotonolactone, caprolactone, etc.

The preferred lactones suitable for use as starting materials in the method are lactones which give polymerizable, aliphatic, ethylenically-unsaturated cyclic nitrile carbonates wherein the ethylenic unsaturation is conjugated to the nitrile group, such as, for example, acrylonitrile carbonate. Thus, some examples of the preferred lactones are β-propriolactone, β-isobutyrolactone, β-isovalerolactone, etc.

The reaction of the lactone and hydroxylamine (Equation 1, above) can be effected by combining the reactants in the presence of a suitable solvent for the hydroxylamine, for example, tetrahydrofuran, ether, methanol, etc., at temperatures below the decomposition temperature of the hydroxylamine, say about −10 to 70° C., preferably about −5° C. to 30° C. The hydroxy-aliphatic hydroxamic acid product can be precipitated from admixture with an organic solvent by the addition of, for example, chloroform, and recovered by filtration. Should the reaction be conducted in water, the product can be recovered by removal of water under reduced pressure.

In the reaction of phosgene and the hydroxy-aliphatic hydroxamic acid (Equation 2), the amount of the phosgene employed is preferably in excess of the stoichiometric amount. The reaction temperature should be kept below that at which the chlorine of the chloroformate reacts, for instance, at a temperature below about 15° C., for example, in the range of about −5 to 5° C. If it is desired to employ a solvent for the hydroxamic acid, solvents which do not react with phosgene, for example, hydrocarbon solvents, chlorinated hydrocarbons, etc., should be employed. To hasten the reaction of the hydroxy-aliphatic hydroxamic acid and phosgene, a weakly basic material which is unreactive towards the chloroformate product, for instance, dimethylaniline, may be added to combine with the HCl produced in the reaction and provide a substantial absence of free HCl in the reaction mixture. An excess of the basic material should be avoided since it later is removed from the product. After removal of volatiles, for example, excess phosgene, solvent, etc., the desired cyclic nitrile chloroformate can be recovered.

Decarboxylation-dehydrohalogenation of the cyclic nitrile chloroformate to give a cyclic nitrile adduct monomer having the desired polymerizable, ethylenically-unsaturated aliphatic substituent (Equation 3) can be effected by treating the cyclic nitrile chloroformate with a strong tertiary aliphatic amine such as triethylamine. The exothermic reaction is conducted at a rate such that a temperature preferably in the range of about 20 to 40° C. is maintained. The reaction mixture is separated by, for example, washing with water to remove the amine hydrochloride and dried. The desired cyclic nitrile adduct monomer can be recovered by distillation.

The following examples will serve to illustrate the present invention but are not to be considered limiting:

EXAMPLE I

Preparation of p-vinylbenzonitrile carbonate

A solution of 12 g. (0.074 mole) of p-vinylbenzohydroxamic acid and 100 cc. (large excess) of phosgene in 75 cc. ether and 25 cc. tetrahydrofuran was allowed to stir at room temperature for half an hour. The reaction mixture was filtered and the solvents removed under reduced pressure. There resulted, after trituration with pentane, 9.8 g. (70%) of p-vinylbenzonitrile carbonate, M.P. 70–72° C.

Analysis.—Calcd. for $C_{10}H_7NO_3$ (percent): C, 63.49; H, 3.73; N, 7.41; O, 25.37. Found (percent): C, 64.45; H, 3.99; N, 7.08.

The infrared spectrum of the product ("Nujol" mull) showed the typical nitrile carbonate absorptions.

EXAMPLE II

Preparation of p-vinylbenzonitrile sulfite

To a rapidly stirred mixture of 16.3 g. (0.10 mole) of p-vinylbenzohydroxamic acid in 100 cc. ether was added dropwise 23.8 g. (0.20 mole) of thionyl chloride over a period of half an hour. The reaction mixture was allowed to stir for another half-hour at room temperature. The resulting solution was filtered and the solvents removed under reduced pressure. There was obtained 19.3 g. (92%) of p-vinylbenzonitrile sulfide, M.P. 56–60° C. Recrystallization from an ether-pentane mixture gave white crystals, M.P. 60–61° C.

Analysis.—Calcd. for $C_9H_7NO_3S$ (percent): C, 51.70; H, 3.35; N, 6.70; O, 22.92; S, 15.33. Found (percent): C, 52.23; H, 3.57; S, 15.45.

The infrared spectrum of the product ("Nujol" mull) showed the typical nitrile sulfite peaks.

EXAMPLE III

Preparation of p-vinylbenzonitrile oxalate

To a 20 cc. (large excess) of oxalyl chloride was added in portions 1.0 g. (0.0061 mole) of p-vinylbenzohydroxamic acid and the reaction mixture refluxed for five minutes. The resulting solution was filtered and set aside until the product crystallized from solution. There was obtained 0.80 g. (62%) of p-vinylbenzonitrile oxalate, M.P. 145–147° C.

Analysis.—Calcd. for $C_{11}H_7NO_4$ (percent): C, 60.83; H, 3.25; N, 6.45; O, 29.47. Found (percent): C, 60.58; H, 3.42; N, 6.70.

The infrared spectrum of the product ("Nujol" mull) showed typical nitrile oxalate absorptions.

EXAMPLE IV

Preparation of acrylonitrile carbonate (A) Preparation of β-hydroxy-propiohydroxamic acid.— To a 3 liter, 3 necked, fluted, round bottom flask equipped with stirrer, dropping funnel, condenser and thermometer, containing 800 ml. of methanol and 208.5 g. (3 moles) of hydroxylamine hydrochloride, were added 303 g. (3 moles) of triethylamine dropwise at room temperature. The slurry was stirred constantly. After the addition was completed the temperature was taken down to 0° C. and maintained there while 216 g. (3 moles) of β-propiolactone was added dropwise. The reaction mixture was then allowed to equilibrate to room temperature and β-hydroxypropiohydroxamic acid was precipitated out by adding 2400 ml. of chloroform. After standing in the refrigerator for some hours the crystalline product was filtered off, dried at reduced pressure, and 241 g. (77% yield) of β-hydroxypropiohydroxamic acid, identified by I.R. analysis and melting point was recovered.

(B) Preparation of 2-(nitrile carbonato) ethyl chloroformate.—The set-up described in step I container 900 ml. of chloroform and 150 g. (1.42 moles) of β-hydroxypropiohydroxamic acid, was charged with 350 g. (3.56 moles) of phosgene. The temperature was kept at 0° C. throughout the reaction. A dropwise addition of dimethylaniline followed with all of the β-hydroxypropiohydroxamic acid being dissolved and a colorless solution obtained.

The reaction mixture was allowed to equilibrate to room temperature and the excess phosgene was removed at reduced pressure. After washing four times with ice-water and drying by filtering through a bed of magnesium sulfate, the excess solvent was removed and 246 g. (90% yield) of 2-(nitrile carbonato) ethyl chloroformate was obtained.

The product was identified by its characteristic I.R. absorption at 5.35, 5.45 and 5.62μ, and by elemental analysis. Calculated: C, 31.10%; H, 2.10%; N, 7.2%; Cl, 18.3%. Obtained: C, 31.27%; H, 2.45%; N, 6.45%; Cl, 18.5%.

(C) Preparation of acrylo nitrile carbonate.—A 2-liter, fluted, round bottom flask equipped with stirrer, condenser, dropping funnel and thermometer, containing 233 g. (1.2 moles) of 2-(nitrile carbonato) ethyl chloroformate and 2.33 g. of p-methoxyphenol as an inhibitor, was treated with 109.7 g. (1.08 moles) of triethyl amine. The addition was carried out dropwise and at room temperature. The reaction mixture was then allowed to stand for several hours and was then washed with ice-water (3 times), dried over magnesium sulfate and distilled at reduced pressure to yield a liquid product having a boiling point of 51° C. at 4 mm. Hg pressure. The product, 85 g. of which were obtained (69% yield), was identified by the characteristic I.R. absorption of 5.35, 5.45 and 9.65μ and by elemental analysis: Calculated: C, 42.48%; H, 2.65%. Obtained: C, 42.50%; H, 2.90%.

EXAMPLE V

Preparation of homopolymer of acrylonitrile carbonate

A yield of the liquid monomer obtained in Example IV was allowed to stand in a capped bottle for several months to effect polymerization. The mixture was extracted with pentane to remove unreacted monomer. There resulted 54% of a homopolymer of acrylonitrile carbonate, M.P. less than 200° C. (decomposed). The infrared spectrum ("Nujol" mull) of the homopolymer showed the typical carbonate absorptions. The polymer gave the following data upon analysis: Calcd.: C, 42.49%; H, 2.67%; N, 12.39%. Found: C, 42.51%; H, 3.06%; N, 12.70%.

EXAMPLE VI

Preparation of p-vinylbenzonitrile sulfite-styrene copolymer

A 200 cc. pressure bottle was charged with 1.5 g. of p-vinylbenzonitrile sulfite, 28.5 g. of styrene, 1.5 g. of azoisobutyronitrile (AIBN), as initiator, and 60 g. of benzene. The system was purged with nitrogen for 10 minutes. The bottle was sealed and placed in a "Launderometer" at 50° C. and turned for forty hours. The reaction mixture was transferred to a suction flask and the benzene removed under reduced pressure. The polymer was triturated four times with 250 cc. portions of pentane. There was obtained 21.0 g. (70%) of copolymer.

*Analysis.*—Calcd. for 5% of $C_9H_7NO_3S$ and 95% of $C_8H_8$ (percent): C, 80.61; H, 6.49; N, 1.91; O, 6.58; S, 4.39. Found (percent): C, 83.46; H, 6.77; N, 2.37; S, 1.92.

The infrared spectrum of the copolymer ("Nujol" mull) showed a stronge isocyanate peak and no nitrile sulfite absorptions.

EXAMPLE VII

Preparation of p-vinylbenzonitrile oxalate-styrene copolymer

Similarly, 1.6 g. of p-vinylbenzonitrile oxalate, 28.5 g. of styrene, 1.5 g. of AIBN and 60 g. of benzene were charged to a 200 cc. pressure bottle and turned for twenty hours at 50° C. There resulted 15.2 g. (51%) of copolymer, M.P. 100–115° C., osmometer M.W., 4178.

*Analysis.*—Calcd. for 5% of $C_{11}H_7NO_4$ and 95% of $C_8H_8$ (percent): C, 90.66; H, 7.51; N, 0.33; O, 1.50. Found (percent): C, 88.72; H, 7.70; N, 0.73.

The infrared spectrum of the copolymer ("Nujol" mull) showed the typical nitrile oxalate absorptions. A sample of the copolymer was heated to boiling for one minute in o-dichlorobenzene and the infrared spectrum of the resulting solution showed the disappearance of nitrile oxalate peaks and the appearance of a strong isocyanate band.

EXAMPLE VIII

Preparation of p-vinylbenzonitrile carbonate-styrene copolymer

In a similar manner, 1.5 g. of p-vinylbenzonitrile carbonate, 28.5 g. of styrene, 1.5 g. of AIBN and 60 g. of benzene were charged to a 200 cc. pressure bottle and turned for twenty hours at 50° C. There was obtained 14.4 g. (48%) of copolymer, M.P. 105–110° C., osmometer M.W. 5915.

*Analysis.*—Calcd. for 5% of $C_{10}H_7NO_3$ and 95% of $C_8H_8$ (percent): C, 90.83; H, 7.54; N, 0.37; O, 1.26. Found (percent): C, 89.67; H, 7.75; N, 0.85.

The infrared spectrum of the copolymer ("Nujol" mull) showed significant peaks characteristic of nitrile carbonates and no isocyanate absorption.

EXAMPLE IX

Copolymerization of acrylonitrile carbonate and styrene

To a solution of 20.8 g. (0.2 mole) of styrene (inhibitor free) and 4.5 g. (0.4 mole) of freshly distilled acrylonitrile carbonate and 9 g. of anhydrous benzene was added 0.27 g. AIBN initiator in a 200 ml. pressure bottle. The bottle was sealed and agitated at 50° C. for 21 hours. Work-up of the resulting mixture yielded 11.5 g. of a white solid. An I.R. spectrum of the solid in chloroform showed a strong absorption at 5.4–5.5μ, characteristic of the nitrile carbonate group.

Elemental analysis (percent): C, 75.56; H, 6.33; N, 4.2.

EXAMPLE X

Preparation of p-vinylbenzonitrile oxalate-acrylic acid-styrene terpolymer

Using the same procedure, 2.00 g. (0.0092 mole) of p-vinylbenzonitrile oxalate, 0.66 g. (0.0092 mole) of acrylic acid, 27.34 g. (0.26 mole) of styrene, 1.50 g. AIBN and 60.0 g. of benzene were placed in a 200 cc. pressure bottle and turned for twenty hours at 50° C. There was obtained 16.0 g. (52%) of terpolymer, M.P. 129–139° C.

*Analysis.*—Calcd. for 3.3% (mole) of $C_{11}H_7NO_4$, 3.3% (mole) of $C_3H_4O_2$ and 93.4% (mole) of $C_8H_8$ (percent): C, 89.21; H, 7.39; N, 0.43; O, 2.97. Found (percent): C, 85.37; H, 7.53; N, 0.99.

The infrared spectrum of the terpolymer ("Nujol" mull) showed carboxyl peaks and nitrile oxalate absorptions.

Examination of the data obtained in Examples V through VIII discloses that there is no interference of the nitrile cyclic structures with free radical polymerization. Secondly, the infrared spectra of the polymers reveal that only the cyclic nitrile sulfite structure failed to survive under the conditions of the polymerization reaction utilized. This fact suggests that the nitrile sulfite structure is less thermally stable than the corresponding oxalates and carbonates, and that employing a low temperature polymerization may produce a stable sulfite copolymer.

EXAMPLE XI

Preparation of fumaronitrile dicarbonate

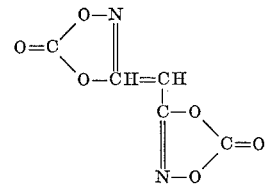

To a 3-liter fluted, round bottom flask equipped with a Dry Ice reflux condenser were added 182.6 g. (1,25 moles) of fumarodihydroxamic acid and 500 cc. of tetrahydrofuran (THF). A two-fold excess of phosgene was fed into the reaction mixture over a period of about two hours and the temperature of the reaction was maintained at about room temperature. The reaction mixture was allowed to stand overnight, whereupon the product was separated from unreacted starting material. There resulted a 66.9% yield of recrystallized (from toluene) fumaronitrile dicarbonate, M.P. 163–165° C. Yield of product is based on reacted starting material.

The infrared spectrum ("Nujol" mull) of the product showed the typical nitrile carbonate absorptions. The product gave the following data upon analysis: Calculated: C, 36.38%; H, 1.02%; N, 14.14%. Found: C, 36.70%; H, 1.42%; N, 12.63%.

EXAMPLE XII

Preparation of fumaronitrile disulfiate

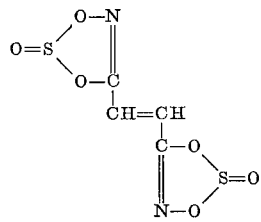

To a 300 cc. fluted, round bottom flask equipped with a reflux condenser attached to a $CaCl_2$ drying tube were added 4.2 g. (0.029 mole) of fumarodihydroxamic acid and 248 g. (2.08 moles) of thionyl chloride. The reaction mixture was stirred mechanically and heated to reflux for half an hour. The resulting solution was filtered and the thionyl chloride removed under reduced pressure. There resulted a quantitative yield of crude fumaronitrile disulfite, M.P. 149–150° C. (decomposed). Recrystallization from benzene gave white needles, M.P. 150° C. (decomposed). The infrared spectrum ("Nujol" mull) of the recrystallized material showed the typical cyclic nitrile sulfite absorptions.

The product gave the following data upon analysis: Calculated: C, 20.20%; H, 0.84%; N, 11.80%. Found: C, 21.70%; H, 1.25%; N, 13.90%.

It is claimed:

1. An ethylenically-unsaturated, cyclic nitrile adduct having the general formula:

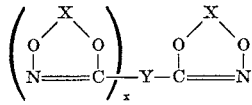

wherein —X— is selected from the group consisting of

and

radicals, $x$ is 0 or 1, and Y is an unsaturated hydrocarbon group of which the unsaturation is either ethylenic only or ethylenic and aromatic only, said Y containing 2 to about 20 carbon atoms and an addition-polymerizable, terminal ethylenic group, 2. The adduct of claim 1 wherein Y is a mono- or di-ethylenically-unsaturated hydrocarbon group of up to about 12 carbon atoms.

3. The adduct of claim 2 wherein —X— is

4. The adduct of claim 2 wherein —X— is

5. The adduct of claim 4 wherein $x$ is 0.

6. Para-vinylbenzonitrile carbonate having the structural formula:

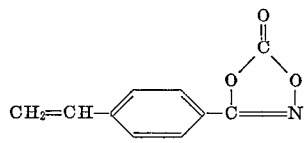

7. Para-vinylbenzonitrile sulfite having the structural formula:

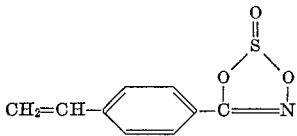

8. Acrylonitrile carbonate having the structural formula:

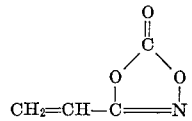

9. Fumaronitrile dicarbonate having the structural formula:

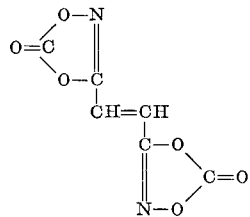

10. Fumaronitrile disulfite having the structural formula:

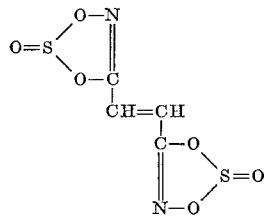

11. An ethylenically-unsaturated, cyclic nitrile adduct having the general formula:

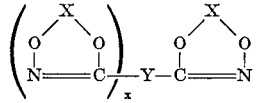

wherein —X— is selected from the group consisting of

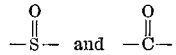

radicals, $x$ is 0 or 1, and Y is an addition-polymerizable, ethylenically-unsaturated hydrocarbon group of which the unsaturation is ethylenic only, said Y containing 2 to about 20 carbon atoms.

12. The adduct of claim 11 wherein Y contains a vinylene group.

13. The adduct of claim 12 wherein Y is mono- or diethylenically-unsaturated and contains 2 to about 6 carbon atoms.

14. The adduct of claim 13 wherein $x$ is 1 and Y is monoethylenically-unsaturated.

15. The adduct of claim 14 wherein —X— is

16. The adduct of claim 14 wherein —X— is

17. An ethylenically-unsaturated, cyclic nitrile adduct having the general for formula:

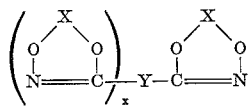

wherein —X— is

x is 0 or 1, and Y i san addition polymerizable, ethylenically-unsaturated hydrocarbon group of which the unsaturation is either ethylenic only or ethylenic and aromatic only, said Y containing 2 to about 20 carbon atoms.

References Cited

UNITED STATES PATENTS 3,238,220   3/1966   Boshagen et al. _____ 260—307
3,268,542   8/1966   Burk et al. _____ 260—301

OTHER REFERENCES

Bergmann, The Chemistry of Acetylene and Related Compounds, page 80, Interscience Publishers, Inc. N.Y. (1948).

Beck, Chem. Ber. vol. 84, pages 688 to 689 (1951).

Knunyants et al., Doklady Akad. Nauk. SSSR, vol. 127, pp. 337 to 340 (1959).

Chemical Abstracts, vol. 67, page 5590, col. 2 abstracting No. 63872 (1967).

JOHN D. RANDOLPH, Primary Examiner

U.S. Cl. X.R.

260—2.5, 63, 78.4, 78.5, 79.3, 244, 301, 307, 453, 463, 500.5